United States Patent
Min et al.

(10) Patent No.: US 6,882,497 B2
(45) Date of Patent: Apr. 19, 2005

(54) TRACK CLOSURE ERROR CANCELLATION FOR A DISC DRIVE

(75) Inventors: ShuangQuan Min, Singapore (SG); KianKeong Ooi, Singapore (SG); WeiSung Lee, Singapore (SG); WingKong Chiang, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 530 days.

(21) Appl. No.: 10/090,875

(22) Filed: Mar. 4, 2002

(65) Prior Publication Data

US 2003/0058570 A1 Mar. 27, 2003

Related U.S. Application Data (60) Provisional application No. 60/324,387, filed on Sep. 24, 2001.

(51) Int. Cl.[7] ............................................... G11B 5/596
(52) U.S. Cl. ................................. 360/77.04; 360/77.08
(58) Field of Search ............................. 360/77.02, 75, 360/77.04, 77.07, 77.08, 51

(56) References Cited

U.S. PATENT DOCUMENTS

| | | | |
|---|---|---|---|
| 4,075,667 A | 2/1978 | Rose et al. | |
| 4,531,167 A | 7/1985 | Berger | |
| 4,802,033 A | 1/1989 | Chi | |
| 5,162,955 A | 11/1992 | Burdenko | |
| 5,333,140 A | 7/1994 | Moraru et al. | |
| 5,339,204 A | 8/1994 | James et al. | |
| 5,448,429 A | * 9/1995 | Cribbs et al. | ................. 360/75 |
| 5,600,500 A | 2/1997 | Madsen et al. | |
| 5,774,295 A | 6/1998 | Tsai | |
| 5,835,300 A | 11/1998 | Murphy et al. | |
| 5,889,631 A | 3/1999 | Hobson | |
| 6,285,522 B1 | 9/2001 | McKenzie et al. | |
| 6,311,140 B1 | 10/2001 | Morris et al. | |
| 6,324,151 B1 | 11/2001 | Hori | |
| 6,760,186 B1 | * 7/2004 | Codilian et al. | ......... 360/77.11 |
| 2002/0030920 A1 | * 3/2002 | Min et al. | ................. 360/77.04 |

* cited by examiner

*Primary Examiner*—Andrew L. Sniezek
(74) *Attorney, Agent, or Firm*—Fellers, Snider, et al.

(57) ABSTRACT

Track closure errors written into servo sectors of an information track of a disc of a disc drive are resolved from a position control signal generated by a servo control circuit of a data storage device by steps comprising: determining a value for the track closure error from a position error signal, establishing a track closure profile based on the value of the track closure error, and injecting the track profile into the servo control circuit as a feed forward compensation input for the position error signal to resolve the track closure error from the position control signal.

17 Claims, 7 Drawing Sheets

TRACK CLOSURE ERROR CANCELLATION FOR A DISC DRIVE

RELATED APPLICATIONS

This application claims priority to U.S. Provisional Application No. 60/324,387 filed Sep. 24, 2001, entitled Method and Apparatus For Cancellation of Track Closure In A Hard Disc Drive.

FIELD OF THE INVENTION

This invention relates generally to the field of magnetic data storage devices, and more particularly, but not by way of limitation, to track closure error cancellation for a disc drive.

BACKGROUND

Disc drives are used for data storage in modern electronic products ranging from digital cameras to computers and network systems. Typically, a disc drive includes a mechanical portion, or head-disc assembly, and electronics in the form of a printed circuit board assembly mounted to an outer surface of the head-disc assembly. The printed circuit board assembly controls functions of the head-disc assembly and provides a communication interface between the disc drive and a host being serviced by the disc drive.

Typically, the head-disc assembly has a disc with a recording surface rotated at a constant speed by a spindle motor assembly and an actuator assembly positionably controlled by a closed-loop servo system. The actuator assembly supports a read/write head that writes data to and reads data from the recording surface. Disc drives using magneto resistive read/write heads typically use an inductive element, or writer, to write data to information tracks of the recording surface and a magneto resistive element, or reader, to read data from the information tracks during drive operations.

One type of data recorded to and read from the information tracks is servo data. Servo data, including a physical track identification portion (also referred to as a servo track number or physical track number), written to the recording surface define each specific physical track of a number of physical tracks written on the recording surface, and servo bursts, indicating fine position within a physical track. A servo track writer is traditionally used in writing a predetermined number of servo tracks to each recording surface during the manufacturing process. The servo tracks are used by the closed-loop servo system for controlling the position of the read/write head relative to the recording surface during disc drive operations.

High performance disc drives achieve areal bit densities in the range of several gigabits per square centimeter (Gbits/$cm^2$). Higher recording densities can be achieved by increasing the number of bits per centimeter stored along each information track, and/or by increasing the number of tracks per centimeter written across each recording surface. Capacity increases gained through increasing the bits per centimeter stored on each track generally require improvements in the read/write channel electronics to enable data to be written to and subsequently read from the recording surface at a correspondingly higher frequency. Capacity increases gained by increasing the number of tracks per centimeter on each recording surface generally require improvements in servo control systems, which enable the read/write heads to be more precisely positioned relative to the information tracks.

Concentric servo tracks written across the recording surface of the disc is the intended result of a servo write process. Each of the concentric servo tracks should be a closed circle with its center coincident with the axis of rotation of the spindle motor. The concentric servo tracks should exhibit consistent track-to-track spacing relative to each other across the surface of the disc and track closure, i.e., each concentric servo track should conclude at a same radius as it began. However, in practice, factors such as spindle motor vibration, arm resonance and servo writer push pin resonance disrupt the formation of circular servo tracks during the servo write process.

A resulting discontinuity of the servo track caused by those disruptions is referred to as a "track closure error" or as a "track tear servo defect condition" while a resulting inconsistent track-to-track spacing is referred to as "written-in track squeeze." Track closure errors and written-in track squeeze are effects caused by a relative shift in position between the read/write head and the recording surface during the servo write process at a time in the process that the servo data is being written to the recording surface. Written-in track squeeze and track closure errors are each variants of track mis-registration. The amount of mis-registration of one information track has a direct bearing on the ability of the read element to read data stored on an adjacent information track. If the mis-registration of the first information track encroaches on a second and adjacent information track by a sufficient amount, erasure or a partial erasure of data previously written to the second and adjacent information track can occur during a write operation to the first information track. The presence of a mis-registration of a first information track relative to a second adjacent information track, sufficient to cause adjacent track erasure, is referred to as "track squeeze."

Track closure errors are evidenced by a position error signal difference between a first written servo burst and a last written servo burst of the servo track and may lead to servo off-track failures during drive operations. Typically, track closure errors result from a cumulative effect of a plurality of disturbances of varying frequencies. One of the more prominent frequencies of the plurality of disturbances present is a cage frequency of the bearing of the spindle motor. The cage frequency of the spindle motor bearing is the dominant frequency component of most written-in repeatable run-out errors present in the disc drive and accounts for nearly one half of the total disturbance causing track closure errors.

An approach taken by disc drive manufacturers to improve servo control systems has been through the introduction of compensation methods for repeatable run-out errors. Repeatable run-out errors cause the servo track formed during the servo write process to be an irregular, generally circular shape rather than a desired substantially perfect circle, which negatively impact the alignment of the read/write head relative to track center of the data track during data transfer operations. Servo tracks that are an irregular, generally circular shape cause off track conditions of the servo bursts relative to the data track once the data tracks have been formed. Data tracks are formed during a drive level formatting process and are based on the previously written servo tracks. Absent correction for the irregularly shaped servo tracks of the previously written servo tracks, the data tracks formed during the formatting process would mirror the shape of the servo tracks, which would decrease data through put efficiency. Through incorporation of appropriate correction techniques during the format process, and the use the use of those correction techniques during data transfer operations, a generally, substantially circular data track can be produce during the formatting process and used during data transfer operations.

One such construction of repeatable run-out error compensation recently proposed in the art is exemplified by U.S. Pat. No. 6,069,764 issued to Morris et al. The Morris solution incorporates a transformation of a sequence of time domain repeatable run-out values into a sequence of frequency-domain repeatable run-out values, dividing the frequency-domain repeatable run-out values by measured transfer functions of the servo system at selected frequencies, then inversely transforming the resulting frequency-domain sequence of compensation values to produce a sequence of time domain compensation values and injecting the time domain sequence of compensation values into the servo loop to compensate for the repeatable run-out error. This method used to compensate repeatable run-out error is referred to as Zero Acceleration Path (ZAP). ZAP uses the position error signal generated from the servo burst written on the recording surface during the servo write process to determine the real repeatable run-out error and to generate correction factors As track densities continue to increase, track widths decrease and track closure errors become more prominent because the magnitude of the track closure errors relative to the track width increases. For disc drives of common form factor and configuration, the underlying disturbances causing track closure errors remain substantially consistent and produce fairly repeatable displacements between the read/write heads and the associated recording surfaces of the read/write heads. Typically, two forms of disturbances contribute to a large portion of a track closure error. The first disturbance form includes repeatable run-out disturbances that have frequencies lying outside disturbance frequencies selected for frequency based compensation, and the second disturbance form includes non-repeatable run-out events. The contribution to a track closure error of neither of these two disturbance forms is resolved by an application of current compensation techniques. As such, challenges remain and a need persists for improved techniques of resolving track closure errors. It is to this and other features and advantages set forth herein that embodiments of the present invention are directed.

SUMMARY OF THE INVENTION

As exemplified by preferred embodiments, the present invention provides for resolving a track closure error from a position control signal provided by a servo control circuit of a data storage device. Track closure errors are removed from the position control signal by first measuring a position error signal for each of a plurality of servo sectors of the data storage device. Next, a repeatable run-out value is extracted from the position error signal for each of the plurality of servo sectors. Then, a difference between the repeatable run-out value of each first and each second servo sector of each pair of adjacent servo sectors of the plurality of servo sectors is determined and compared to a predetermined value of a track closure threshold value to identify the servo sectors containing the track closure errors. Thereafter, a track closure profile is established for each information track of a plurality of information tracks containing an identified track closure error and injected into the servo control circuit as a feed forward compensation to resolve the track closure error from the position control signal. The track closure profile is provided by a relationship between a servo sector with a track closure error and the remaining servo sectors. The relationship is used to dissipate the track closure error over each of the servo sectors of the information track as a means for resolving the track closure error from the position control signal.

These and various other features and advantages, which characterize the present invention, will be apparent from a reading of the following detailed description and a review of the associated drawings.

DETAILED DESCRIPTION

Figure 1:
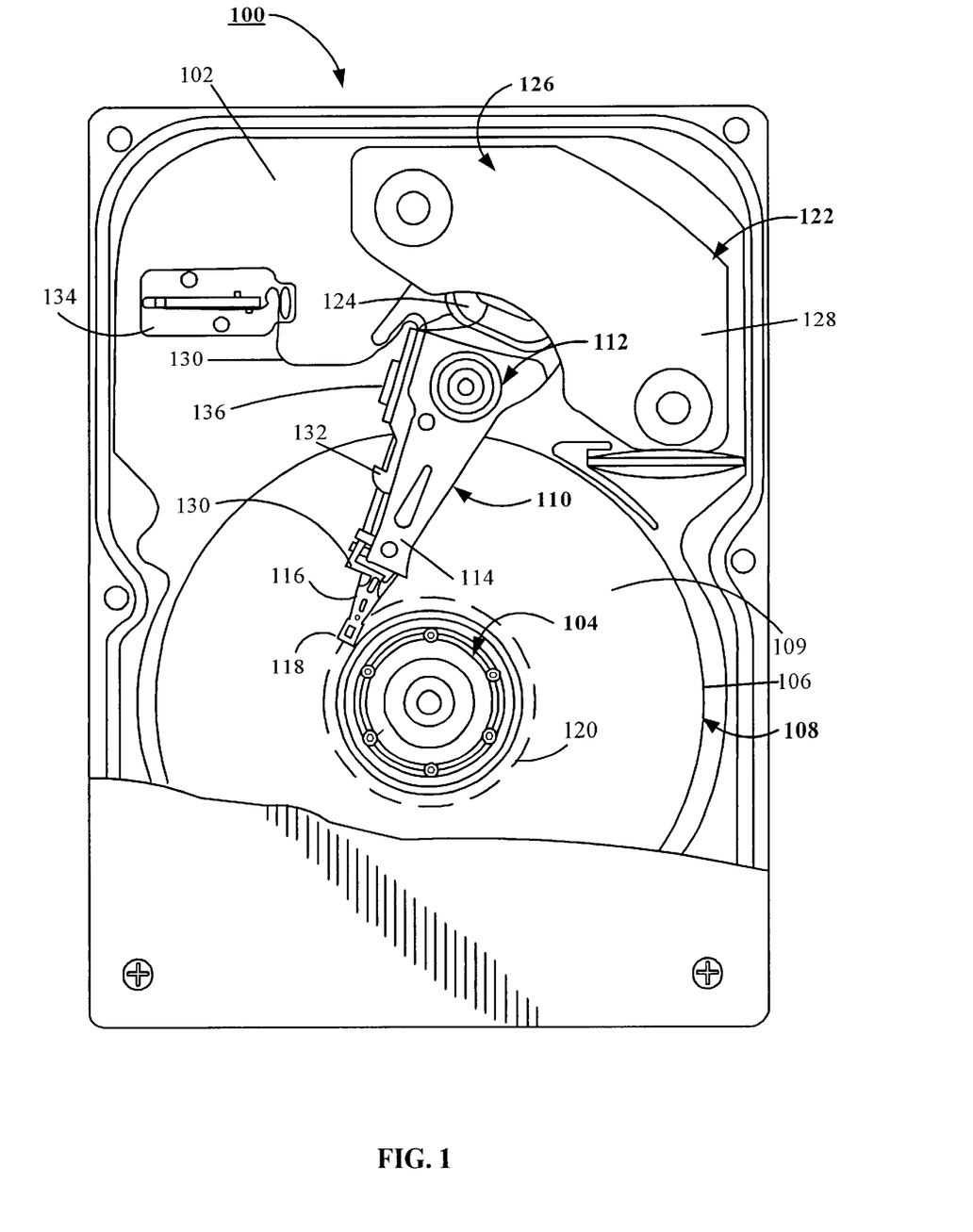
FIG. 1 is a top plan view of a disc drive with a track closure error resolved from a position control signal provided by a servo circuit of the disc drive in accordance with a method of the present invention.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) which pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not separately depicted) used for storing bit patterns or data. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the actuator assembly 110 is controllably positioned by a voice coil motor assembly 122 (also referred to as a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head 118 are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
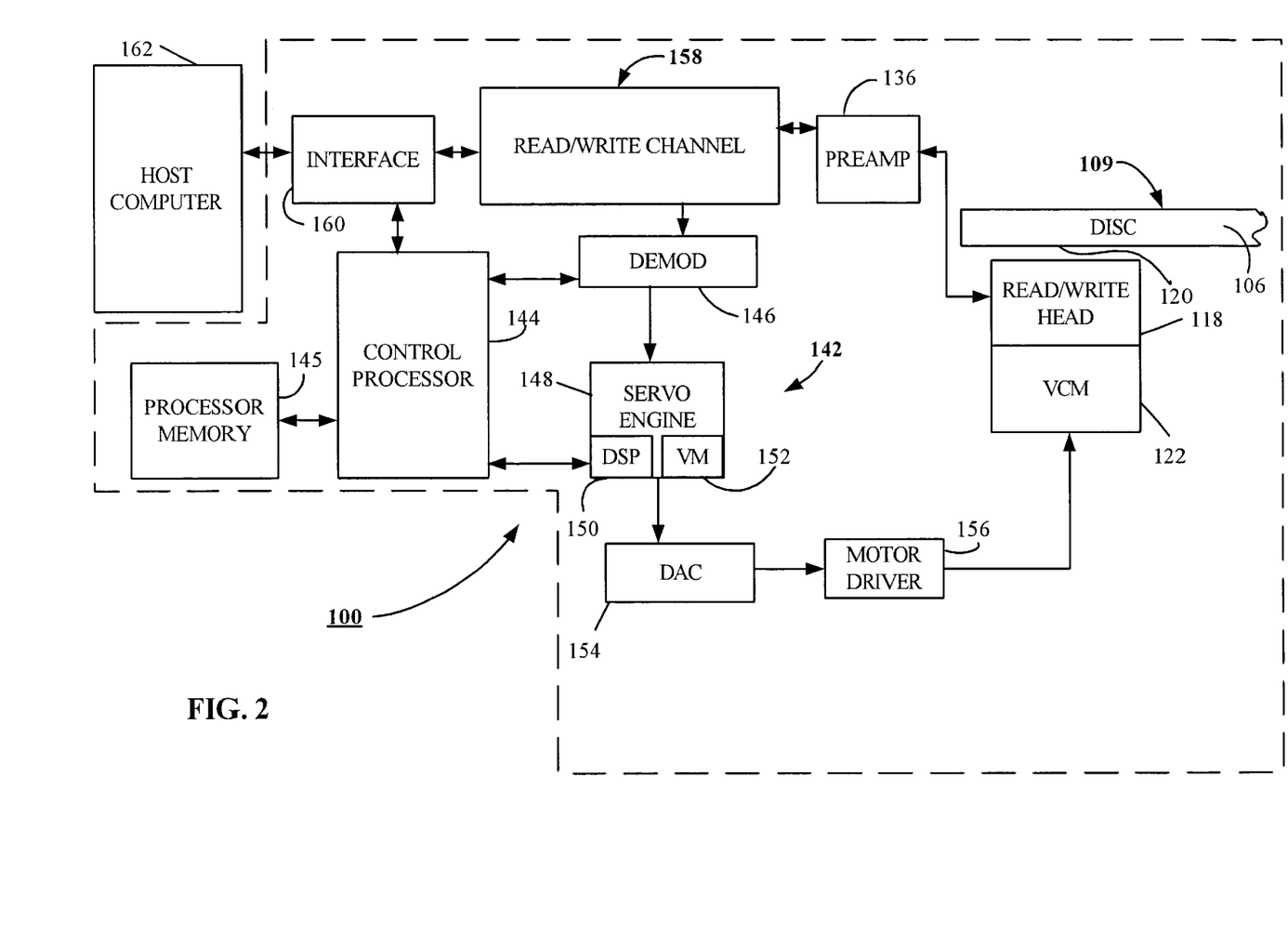
FIG. 2 is a functional block diagram of control circuitry of the disc drive of FIG. 1.

Turning to FIG. 2, position-controlling of the read/write head 118 is provided by the positioning mechanism (not separately shown) operating under the control of a servo control circuit 142 programmed with servo control code, which forms a servo control loop. The servo control circuit 142 includes a control processor 144, a random access memory 145 for use by the control processor 144, a demodulator (demod) 146, an application specific integrated circuit (ASIC) hardware-based servo controller ("servo engine") 148 with a digital signal processor (DSP) portion 150 and a volatile memory (VM) or random access memory (RAM) portion 152, a digital-to-analog converter (DAC) 154 and a motor driver circuit 156. Optionally, the functions of the random access memory 145, the servo engine 148, the digital signal processor 150 and the volatile memory 152 may all be contained within the control processor 144. The components of the control circuit 142 are utilized to facilitate track following algorithms for the actuator assembly 110 (of FIG. 1) and more specifically for controlling the voice coil motor 122 in position-controlling the read/write head 118 relative to the selected information track 120 (of FIG. 1).

The demodulator 146 conditions head position control information transduced from the information track 120 of the rotatable recording surface 109 to provide position information of the read/write head 118 relative to the information track 120. The servo engine 148 generates servo control loop values used by the control processor 144 in generating command signals such as seek signals used by voice coil motor 122 in executing seek commands. Control loop values are also used to maintain a predetermined position of the actuator assembly 110 during data transfer operations. The command signals generated by the control processor 144 are converted by the digital-to-analog converter 154 to analog control signals. The analog control signals are used by the motor driver circuit 156 in position-controlling the read/write head 118 relative to the selected information track 120, during track following, and relative to the recording surface 109 during seek functions.

The read element of the read/write head 118 responds to bit patterns written to the servo sectors as well as bit patterns written to the data sectors of the information track 120. The read element generates a read signal, which is passed to the preamplifier 136, where the amplitude of the signal is increased and then passed to the read/write channel 158. The read/write channel 158 processes the signal and passes data contained within the signal to interface electronics 160 for transmission to the host 162.

Figure 3:
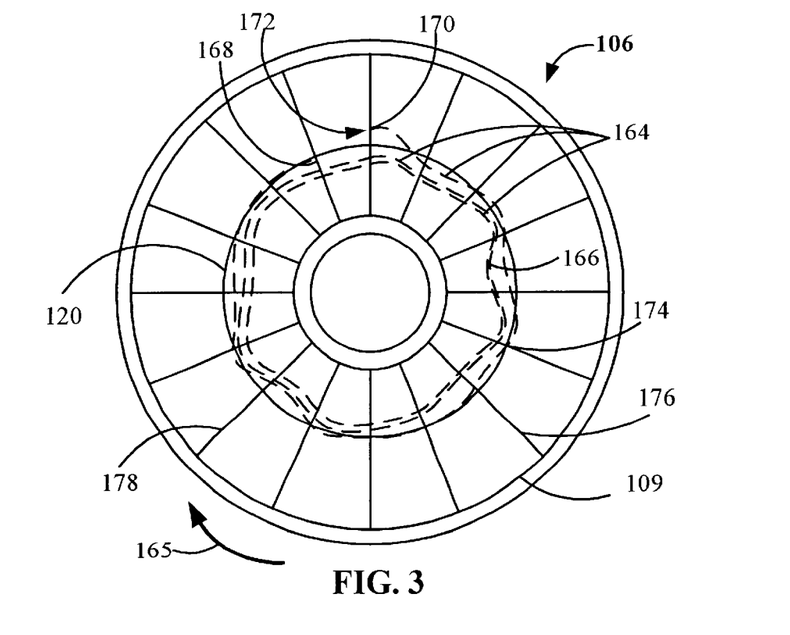
FIG. 3 is a top view of a section of a disc of FIG. 1 showing an ideal track, a pair of illustrative servo tracks exemplifying a written-in track squeeze condition and an illustrative servo track exemplifying a track closure error.

FIG. 3 depicts a top view of the disc 106 providing the recording surface 109 with three illustrative of erratic and distorted circular shaped servo tracks 164 (depicted as dashed lines) of a plurality of servo tracks 164. A rotational direction vector 165 shows a direction of rotation of disc 106. Also depicted by FIG. 3 is a region 166 where two of the three illustrative servo tracks 164 are in very close proximity to each other causing "AC track squeeze," also referred to as written-in track squeeze. Written-in track squeeze is a byproduct of the servo write process. It results as a consequence of either misalignment of the write element of the read/write head 118 relative to the recording surface 109 or misalignment of the recording surface 109 relative to the write element of the read/write head 118 during the servo write process. Also shown by FIG. 3, is a first servo sector 168 of a pair of adjacent servo sectors and a second servo sector 170 of the pair of servo sectors. The pair of adjacent servo sectors, 168 and 170, are each a servo sector of a plurality of servo sectors common to information track 120. Servo sector 170 is shown with a written-in track closure error 172. The track closure error 172 is also a byproduct of the servo write process that results from misalignments between the read/write head 118 and the recording surface 109 that occur during the servo write process. Misalignments between the read/write head 118 and the recording surface 109 caused by disturbances that occur during the servo write process, and disturbances causing misalignments while writing servo sector result in those misalignments being written into the servo sector. A first servo sector 174 of an information track 120 that is written to the recording surface 109 during the servo write process and includes at least one index bit (not separately shown). Thereafter, for each subsequently written servo track 164, each servo sector written at the same rotational position on the recording surface 109 as servo sector 174 includes at least one index bit, and serves as an index servo sector for the subsequently written servo track. Typically the servo sectors are designated as being a number of servo sectors away from index. However, during the servo write process, a first servo sector written to each of the plurality of servo tracks 164 may be a servo sector other the index servo sector for the selected servo track.

For example, with the disc spinning in the direction shown by the rotational direction vector 165, and with the servo write process beginning at servo sector 168 (a first written servo sector), the index servo sector 174 for servo track 164 is written later in time relative to the writing of servo sector 168. In the present example, the selected servo track begins at servo sector 168 and ends at servo sector 170. A track closure occurs for each of the plurality of servo tracks 164 between a first written servo sector of each servo track 164 and a last written servo sector for each servo track 164, in the present case 168 and 170. A track closure error, such as 172, occurs when a relationship, such as the magnitude of a difference between a disturbance written into the first servo sector, such as servo sector 168, and a disturbance written into the last servo sector, such as 170, is greater than a predetermined threshold value $C_t$ (discussed below). Because for each successive servo track written during the servo process, the servo write process may begin writing the first servo sector at any one of a plurality of servo sector locations, a track closure error may be detected between any adjacent pair of servo sectors for a selected information track 120 during a track follow operation.

Each servo sector, such as 168, 170 or 174, includes track identification bits 176 and servo position bits 178 (not separately depicted). The track identification bits 176 define the servo track 164 associated with a specific information track 120. The track identification bits 176 are accessed by a selected read/write head 118 when the disc drive 100 executes a seek request and also during track following operations. The servo position bits 178 are read and used to determine the location of the selected read/write head 118 relative to a track center of the servo sector 174 of the selected servo track 164. Any variation in the position of the read/write head 118 away from circular track 120 is considered a position error.

The regions of servo tracks 164 that do not substantially comply with the geometric shape of the information track 120, when followed by the read/write head 118 during track following, generate repeatable runout errors. The regions of servo sectors 170 that do not substantially comply with the geometric shape of the information track 120 were written into the servo tracks 164, during the servo write process and become written in repeatable runout errors.

The sources of the written in repeatable runout errors are disturbances occurring during the servo write process. Servo write process disturbances can shift the read/write head 118 away from a desired position relative to the disc surface 109 or they can cause a shift in the disc surface 109 away from the desired position relative to the read/write head 118.

A number of the repeatable runout errors written into a particular servo track 164 may have been caused by a non-repeatable disturbance, which occurred during the servo write process. Non-repeatable disturbances cause the shape irregularity of the servo tracks 164 that differ from servo track 164 to servo track 164 across the disc surface 109 as depicted in FIG. 3. The differences in shape irregularity between adjacent servo tracks 164 results in a mismatch in geometric shape between adjacent servo tracks 164. The mismatch in geometric shape between adjacent servo tracks 164 can take the form of written-in track squeeze 166 or can take the form of track closure error 172.

The mismatch in geometric shape between adjacent servo tracks 164 leads to a reduction or expansion in space between the track centers of the adjacent servo tracks 164. Reductions in space between the track centers of the adjacent servo tracks 164 are referred to as track squeeze depicted by sign number 166. Expansions between the track centers of the adjacent servo tracks 164 that have values greater than the predetermined value of the track closure threshold value $C_t$ are referred to as track closure errors or track tears, which can occur at any servo sector written to recording surface 109. Presence of either the track squeeze 166 or track closure error 172 may impinge, disrupt or even lead overwrite of data previously written to an adjacent information track 120. The result of writing data to the information track 120, following the geometric shape of a selected servo track 164 is a "squeezing" of the usable width of the information track adjacent the information track 120, diminishing the ability of the adjacent track to store data.

During the servo write operation, vibration of the spindle motor assembly 104, resonances of the actuator arm 114 or resonances of a servo writer push-pin, may each be a non-repeatable runout disturbance source or can collectively contribute to a disturbance causing a misalignment between read/write head 118 and recording surface 109. For example, spindle motor vibration, known as spindle non-repeatable runout, is composed of low frequency components generated by a bearing assembly (not shown separately) of the spindle motor assembly 114. One component of spindle non-repeatable runout, with a frequency signature in the range of 30–40 hz, is cage frequency.

The effects of disturbances that emanate from vibrational frequencies of structural members of the disc drive 100, such as the spindle motor assembly 114, which become written into a servo sector, such as 168, during the servo write process, can be analyzed and compensated for after the disc drive 100 has completed its manufacturing assembly process. A compensation technique found useful for analyzing and compensating disturbances, such as those emanating from spindle assembly 114, is a zero acceleration path compensation technique. The zero acceleration path compensation technique is exemplified and taught by U.S. Pat. No. 6,069,764 issued to Morris, et al., and assigned to the assignee of the present invention.

Each servo sector, such as 168, 170 or 174, written to the recording surface 109 has a track width substantially the same as each of the other servo sectors written to recording surface 109 because each servo sector was written with a common write element in the read/write head 118. Typically, a track width of servo sectors, such as 168, 170 or 174, uses "servo counts" or counts as a unit of measure. For example, the track width of zero servo sector 174 of information track 120 of disc drive 100 is 256 counts. That is, the width of the servo sector is divided into 256 increments or servo counts, of equal dimension. A first edge of the servo sector is located at a count of negative 127 (−127) counts from track center (servo count 0) of the servo sector. A second edge of the servo sector is located 256 servo counts away from the first edge at a positive 128 (+128) counts from servo count 0.

As the amplitude of the signal generated by the reader of the read/write head 118 reading the servo position bits 178 of the servo sector 174 increases at a substantially linear rate while the reader moves from one of the edges of servo sector 174 to track center of servo sector 174, a correlation between an amplitude read and a number of counts the reader is from track center, or servo count 0, of the servo sector 174 can be made to associate a particular amplitude reading to an associated count.

Figure 6:
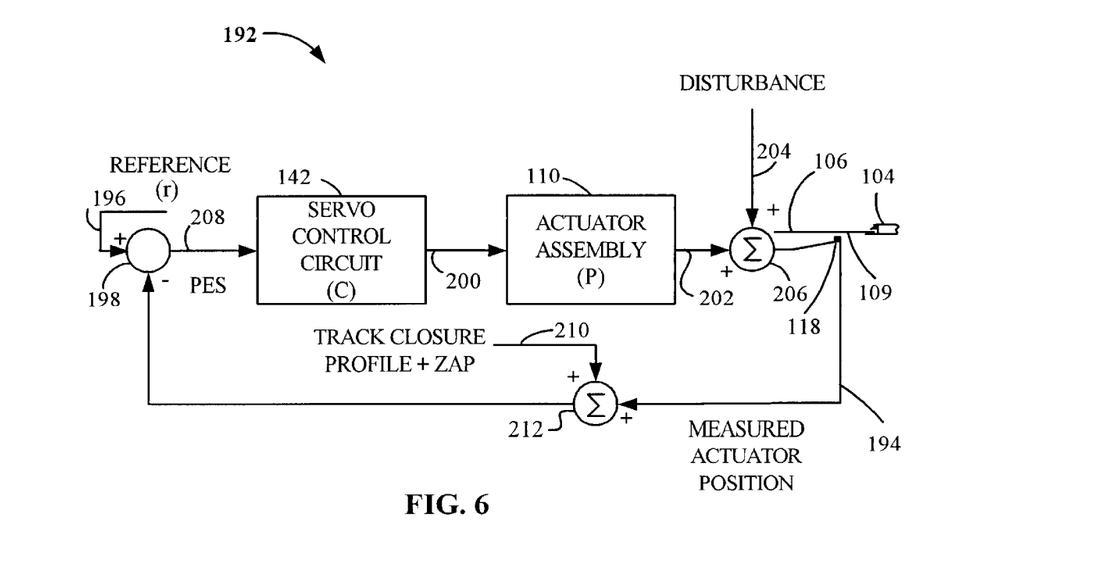
FIG. 6 is a partial simplified block diagram of a servo loop of the disc drive of FIG. 1.

Turning for a moment to FIG. 6, the difference between the reference position signal 196 and the signal generated by the reader of the read/write head 118 reading the servo position bits 178 from servo sector, such as servo sector 174 is generally referred to as a position error signal (PES). During operation of the disc drive 100, two events that occur either individually or in common typically come into play to cause a non-zero count based on the amplitude of the position error signal. Either a random disturbance occurred while reading the servo sector causing a misregistration between the read/write head 118 and recording surface 109, or the servo sector has a written-in error as a result of the servo write process. The random disturbance is referred to as a non-repeatable runout error, the written-in error is referred to as a written-in repeatable runout error.

Returning to FIG. 3, because non-repeatable runout errors encountered during operation of the disc drive 100 are generally random events, use of compensation techniques to counter the effect of non-repeatable runout error occurrences is typically ineffective. However, based on an analysis of the repeatable runout portion of the position error signal, an application of a compensation technique of the present invention has been found effective in resolving the effects a track closure error, such as 172, has on a position control signal (not shown) generated by the servo control circuit 142. The position control signal is used in position-controlling the read/write head 118 relative to the recording surface 109 during operations of the disc drive 100.

The position error signal is comprised of both a repeatable runout portion and a non-repeatable runout portion. Since a track closure error, such as 172, is written into a servo sector, such as 170, the track closure error is a component of the repeatable runout error portion of the position error signal. A useful technique found to isolate the repeatable runout error portion of the position error signal is to average the position error signal over a plurality of revolutions of the disc 106. That is, the repeatable runout portion of the position error signal can be extracted from the position error signal by applying the following equation:

$$R(n) = \sum_{m=1}^{M_0} \frac{P(n, m)}{M_0} \qquad \text{Equation (1)}$$

Where $M_0$ is the total number of revolutions, $P(n, m)$ is the amplitude of the position error signal expressed in counts generated by reading each of the servo sector n, $\{n \notin [0, N-1]\}$, for each revolution m. N is the total number of servo sectors of the information track 120. For example, during each of a predetermined number of revolutions, the amplitude of the position error signal, expressed in counts, for servo sector 170 of the information track 120 is determined and stored. Then, an average count for servo sector 170 is determined from the stored counts of servo sector 170.

Figure 4:
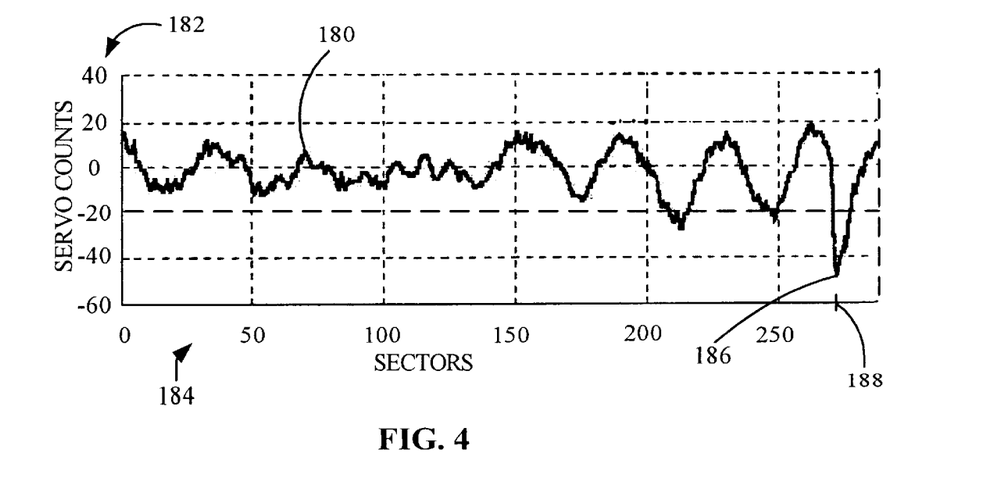
FIG. 4 is a graph of a repeatable run-out of an information track with a track closure error of the disc drive of FIG. 1.

FIG. 4 shows a result of applying equation (1) over five revolutions of recording surface 109. The result is an extraction of the repeatable runout portion 180 of a position error signal, expressed in servo counts 182, for each servo sector of the plurality of servo sectors 184. FIG. 4 also shows a track closure error 186 occurring at servo sector 188 (which has a servo sector designation number of 271).

A track closure value is defined as a relationship, such as a difference between servo counts 182 of two adjacent servo sectors, such as 168 and 170, of the plurality of servo sectors 184 and can be expressed as:

$$C(n) = R(n) - R(n-1) \qquad \text{Equation (2)}$$

Considering the periodicity of the repeatable runout portion 180 of a position error signal, $R(-n) = R(N-n)$. A track closure error in sector K is found if the absolute value of the track closure value $C(K)$ of sector K, i.e. $|C(K)|$, is larger than the predetermined track closure threshold value $C_t$. It is noted that there may be more than one track closure error 186 on the information track 120.

The predetermined track closure threshold value $C_t$ is an empirically derived value that typically differs from disc drive type to disc drive type. The predetermined track closure threshold value $C_t$ represents an upper-level that a servo sector, such as 170, can be offset from an information track, such as 120, relative to an offset of an adjacent servo sector, such as 168, from the information track, without causing adjacent track overwrite problems during write operations. Included in the factors, but not limited to by the following factors, that effect the value of the predetermined track closure threshold value $C_t$ for any particular disc drive type are: track spacing, track width, a ratio of the write width of the writer to the read width of the reader, the response capabilities of a servo control circuit, such as 142, and the interpretative ability of a read/write channel, such as 158, responding to a read signal.

A techniques of identifying adjacent track overwrite is exemplified and taught by U.S. Pat. No. 5,600,500 issued to Madsen et al., and assigned to the assignee of the present invention. A technique for detecting track closure errors, also referred to as track tears, of sufficient magnitude to cause a deallocation of a portion of an information track affected by the track closure error is taught by U.S. Pat. No. 5,889,631 issued to Hobson, and assigned to the assignee of the present invention. A correlation can be drawn between the occurrence of a track tear and the magnitude of the track tear measured by an application of equation (2) to each of a number of sample drives found to exhibit track tears. Based on the observed magnitude of the track tears, or track closure errors, the track closure threshold value $C_t$ is determined.

Figure 5:
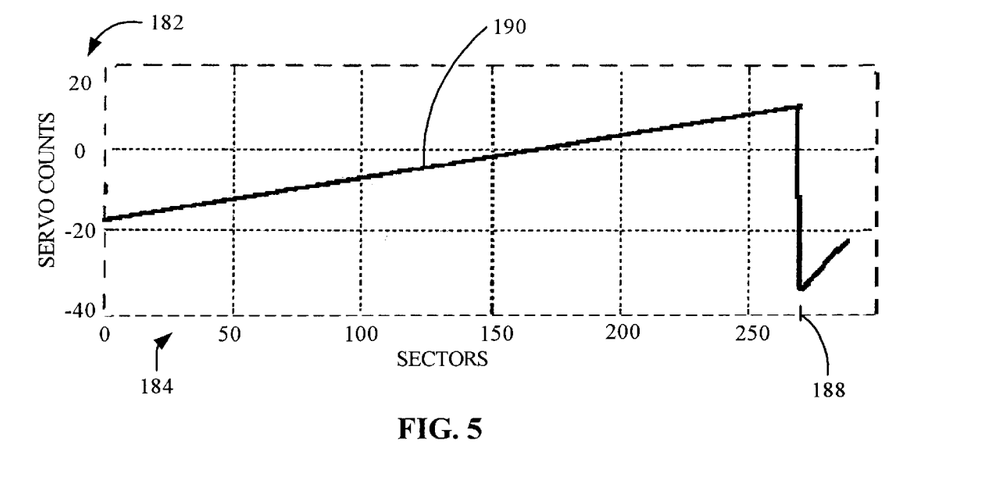
FIG. 5 is a graph showing a track closure profile based on the track closure error of FIG. 4, for use in compensating the track closure error of FIG. 4.

FIG. 5 shows a track closure profile 190 used to mitigate the effects of the track closure error 186 on information track 120. The track closure profile 190 comprises a signal comprising a pre-compensation value determined for each servo sector 184 of the information track 120 based on a relationship of the track closure error 186 of the servo sector K 188 [used in the following equations] and a positional relationship of each of the servo sectors 184 and the servo sector K 188. The relationship of the track closure error 186 of the servo sector K 188 and the positional relationship of each of the servo sectors 184 is preferably determined by an equation in the form of a straight line equation. The equation for determining the track closure profile is:

$Y(n) = a \cdot (n+N-K) + b$ when $0 < n < K$      Equation (3a)

$Y(n) = a \cdot (n-K) + b$ when $K \leq n \leq N-1$      Equation (3b)

Since $Y(K) = R(K)$      Equation (4a)

$Y(K-1) = R(K-1)$      Equation (4b)

by combining (3a), (3b), (4a), (4b), the solution for a hand b is given as:

$$a = \frac{R(K-1) - R(K)}{N-1} \quad \text{Equation (5a)}$$

$$b = R(K) \quad \text{Equation (5b)}$$

Therefore, the track closure profile becomes:

$$Y(n) = \frac{R(K-1) - R(K)}{N-1} \cdot (n + N - K) + R(K) \quad \text{Equation (6a)}$$
when $0 < n < K$
and $$Y(n) = \frac{R(K-1) - R(K)}{N-1} \cdot (n - K) + R(K) \quad \text{Equation (6b)}$$
when $K \leq n \leq N-1$ In FIG. 6, a closed-loop servo system 192 responding to a measured actuator position signal 194 combined with a reference signal 196 at comparing junction 198 provides a position control signal (also referred to as a control current) 200. The control current 200 drives the actuator assembly 110 to position-control the read/write head 118 relative to the recording surface 109 of the disc 106. The closed-loop servo system 192 comprises the servo control electronics 142 position-controlling the actuator assembly 110. The servo control electronics 142 generate the position control signal 200 that drives the voice coil motor 122 of the actuator assembly 110. In response to the position control signal, the actuator assembly 110 produces head motion 202. A position disturbance 204 is shown entering the closed-loop servo system 192 at summing junction 206. The position disturbance 204 emanates from a plurality of sources, which have been divided into three categories. The first category is written-in repeatable runout, the second is written-in non-synchronous noise in the servo system and the third is non-repeatable operating disturbance. The position disturbance 204 implicitly combines with head motion 202 at summing junction 206. Collectively, the position disturbance 204 and the head motion 202 determine the position of the read/write head 118 relative to the recording surface 109. The position of the read/write head 118 relative to a servo sector, such as 188, is determined by the amplitude of the position bits, such as 178, read by the read/write head 118 flying over the servo sector. The signal produced by the read/write head 118 reading the position bits 178 constitutes the measured actuator position signal 194. The combination of a non-compensated measured actuator position signal 194 and the reference signal 196 produces a position error signal 208 (PES 208), which is input to servo control electronics 142. The effect of inclusion of the non-compensated measured actuator position signal 194 is an inclusion of the position disturbance 204 in the position error signal 208.

However, by including a feed forward compensation signal 210 at summing junction 212, the effects of a portion of the position disturbance 204 can be resolved from the measured actuator position signal 194, which results in the resolution of those same effects of the position disturbance 204 from the position control signal 202. The feed forward compensation signal 210 may include a zero acceleration path compensation signal (not separately shown), the track closure profile 190 for each information track 120 of recording surface 109 found to have at least one track closure error 172, or a combination of the zero acceleration path compensation signal in track closure profile 190. In the case of the feed forward compensation signal 110 resulting from a combination of the zero acceleration path compensation signal and the track closure profile 190, the zero acceleration path compensation signal is applied to each information track 120 absent a track closure error 172 while the combination of the zero acceleration path compensation signal and the track closure profile 190 is applied to each information track 120 found to have at least one track closure error.

Figure 7:
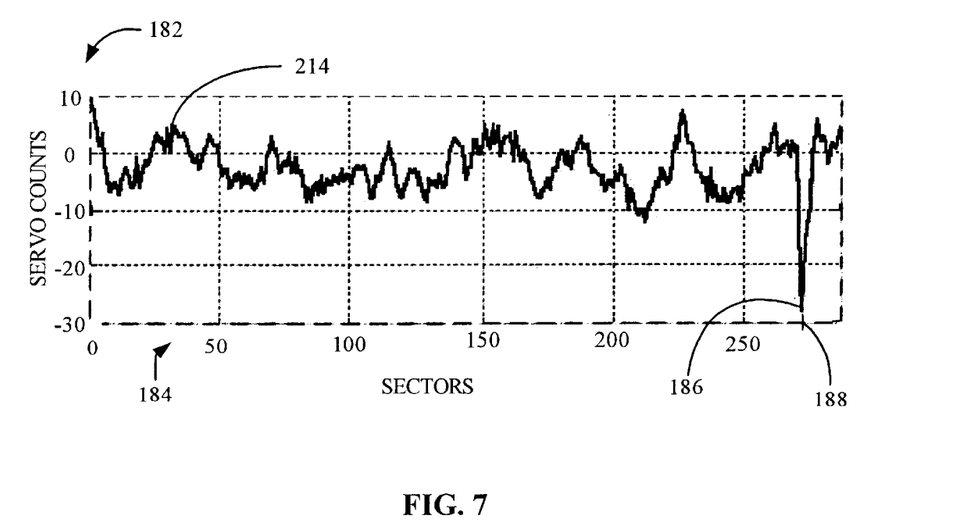
FIG. 7 is a graph showing the repeatable run-out of the information track of FIG. 4 following application of a zero acceleration compensation technique.

As shown by FIG. 7, an application of the zero acceleration path compensation technique, absent an inclusion of the track closure profile 190, to the repeatable runout portion 180 of the position error signal 208 results in a repeatable runout portion 214 of the position error signal 208 with a significantly reduced amplitude compared to the non-compensated repeatable runout portion 180 of the position error signal 208 of FIG. 4. As noted by the change in scale of the servo counts between FIG. 4 and FIG. 7, the amplitude of the repeatable runout portion 214 of the position error 208 is reduced to approximately one half the amplitude of the non-compensated repeatable runout portion 214 of the position error 208, with the exception of the track closure error 186 of the servo sector 188.

The track closure error 186 of the servo sector 188 of the repeatable runout portion 214 of the position error 208 has been reduced in amplitude by less than one-half the amplitude of the non-compensated repeatable runout portion 214 of the position error 208. The servo sector 188 of the repeatable runout portion 214 of the position error 208 remains the servo sector of information track 120 with the maximum deviation from track center of the information-track 120.

Figure 8:
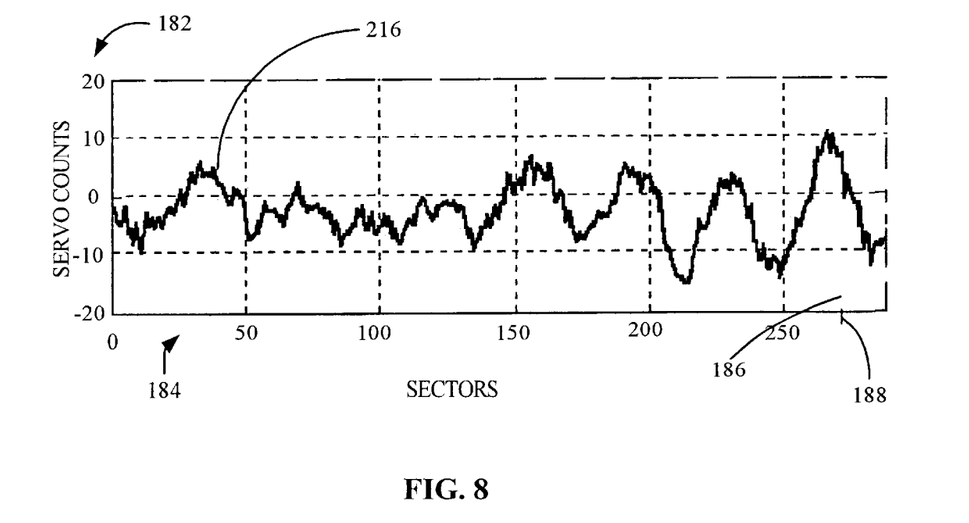
FIG. 8 is a graph showing the repeatable run-out of the information track of FIG. 4 following application of the zero acceleration path compensation technique and the track closure profile.

As shown by FIG. 8, application of the feed forward compensation signal 210 comprising the track profile 190 in combination with the zero acceleration path compensation technique, leaving a repeatable runout portion 216 of the position error 208 substantially free of the track closure error 186. In other words, in normal read/write operation, if −Y(n) is added into the measured actuator position signal 194, the track closure error 186 in servo sector 188, i.e., servo sector K, is substantially removed from the position control signal 200. The idea behind the use of equations (6a) and (6b) for the generation of the track closure profile 190 is to normalize the track closure error 186 among all servo sectors 184. Since only the track closure error 186 itself is involved in the calculation of equations (6a) and (6b), the track closure error 186 can be substantially cancelled regardless of the root cause of the track closure 186.

Application of frequency based compensation techniques, such as the zero acceleration path compensation technique absent the track profile 190, cancels only the portion of the track closure error 186. Because the track closure profile 190 comprises a pre-compensation value determined for each servo sector 184 of the information track 120 based on a relationship of the track closure error 186 of the servo sector 188 and the positional relationship of each of the servo sectors 184 and the servo sector 188, providing the combined feed forward compensation signal 210 can be accomplished without increasing the overhead of certification testing within the manufacturing process. The combined feed forward signal 210 results from an addition of each pre-compensation value determined for each servo sector 184 for each information track 120 found to have a track closure error 186 to a zero acceleration value determined for each servo sector of the information track 120 found to have a track closure error. The track closure profile 190 can be added to the zero acceleration path values either at the beginning or at the end of the zero acceleration path learning portion of executing the zero acceleration path compensation technique.

Track closure errors typically occur between the first written servo sector and the last written servo sector of an information track 120. However, an error occurring between any pair of adjacent servo sectors of the information track 120 that mimics a track closure error (i.e., the magnitude of a difference between a disturbance written into the first of the pair of adjacent servo sectors and a disturbance written into the second of the pair of adjacent servo sectors that is greater than the predetermined threshold value $C_t$) may be treated as though it were a typical track closure error. No distinction is made between a typical track closure error and an error mimicking a track closure error for resolution of the error.

Figure 9:
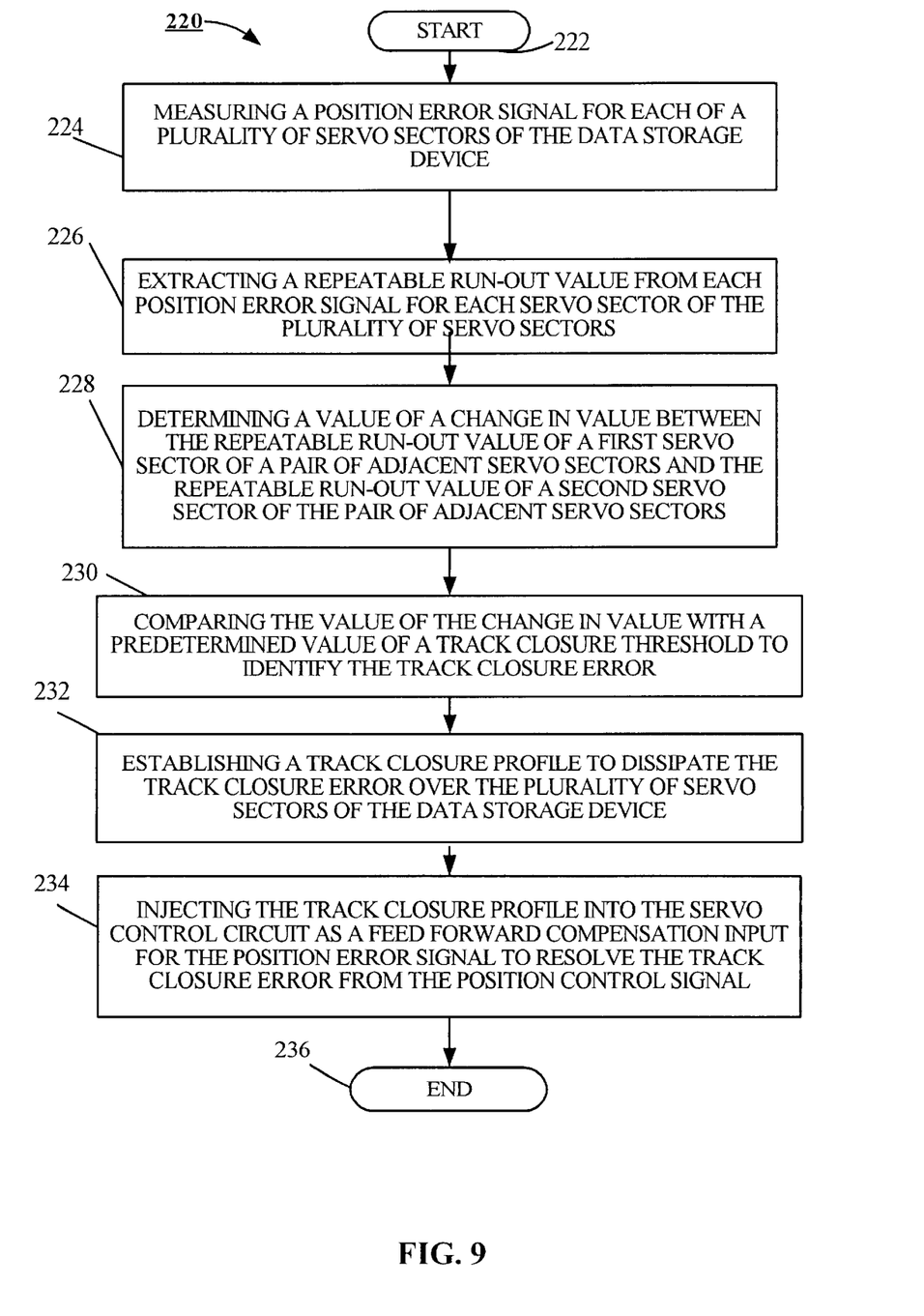
FIG. 9 is a flow chart of a method used in resolving the track closure error from the position control signal provided by the servo control circuit of the data storage device of FIG. 1.

FIG. 9 depicts a track closure error resolution process 220 for resolving a track closure error (such as 186) from a position control signal (such as 200) provided by a servo control circuit (such as 142) of a data storage device (such as 100) beginning at start process step 222. The track closure error resolution process 220 continues at process step 224 where a position error signal (such as 208) is determined for each servo sector (such as 184) of an information track (such as 120) for each of a plurality of revolutions of a recording surface (such as 109) of a disc (such as 106) rotating beneath a reader of a read/write head (such as 118). The disc is attached to a spindle motor assembly (such as 104) for rotation of the recording surface 109.

The track closure error resolution process 220 continues at process step 226 where a repeatable run-out value is extracted from the position error signal of each of the servo sectors of the information track to form a repeatable runout portion (such as 180) of the position error signal. The repeatable runout portion of the position error signal for each servo sector of the information track is expressed in servo counts (such as 182). The repeatable runout portion of the position error signal for each particular servo sector of the information track is determined by taking an average of the values of the position error signal read during each of the plurality of revolutions of the recording surface beneath a read/write head for the particular servo sector.

At process step 228, the track closure error resolution process 220 continues with the determination of a difference between the repeatable run-out values of a first servo sector (such as 168) and a second servo sector (such as 170) of a pair of adjacent servo sectors to check for the presence of a track closure error (such as 172) and either of the servo sectors of the pair of servo sectors. The indifference and value, or changing value, of the repeatable run-out values of the pair of adjacent servo tracks is compared with a predetermined value of a track closure threshold value $C_t$ to identify the presence of a track closure error in either of the pair of adjacent servo tracks in process step 230.

Process step 232 continues the track closure error resolution process 220 by establishing a track closure profile (such as 190) to dissipate track closure errors, discovered during process step 230, over the plurality of servo sectors of the information track. The track closure profile is injected in process step 234 as a feed forward compensation signal (such as 210) into a close looped servo system (such as 190) using a servo control circuit (such as 142) to substantially complete the resolve track closure error from the position control signal. Following process step 234, the track closure error resolution process 220 concludes that in process step 236.

Figure 10:
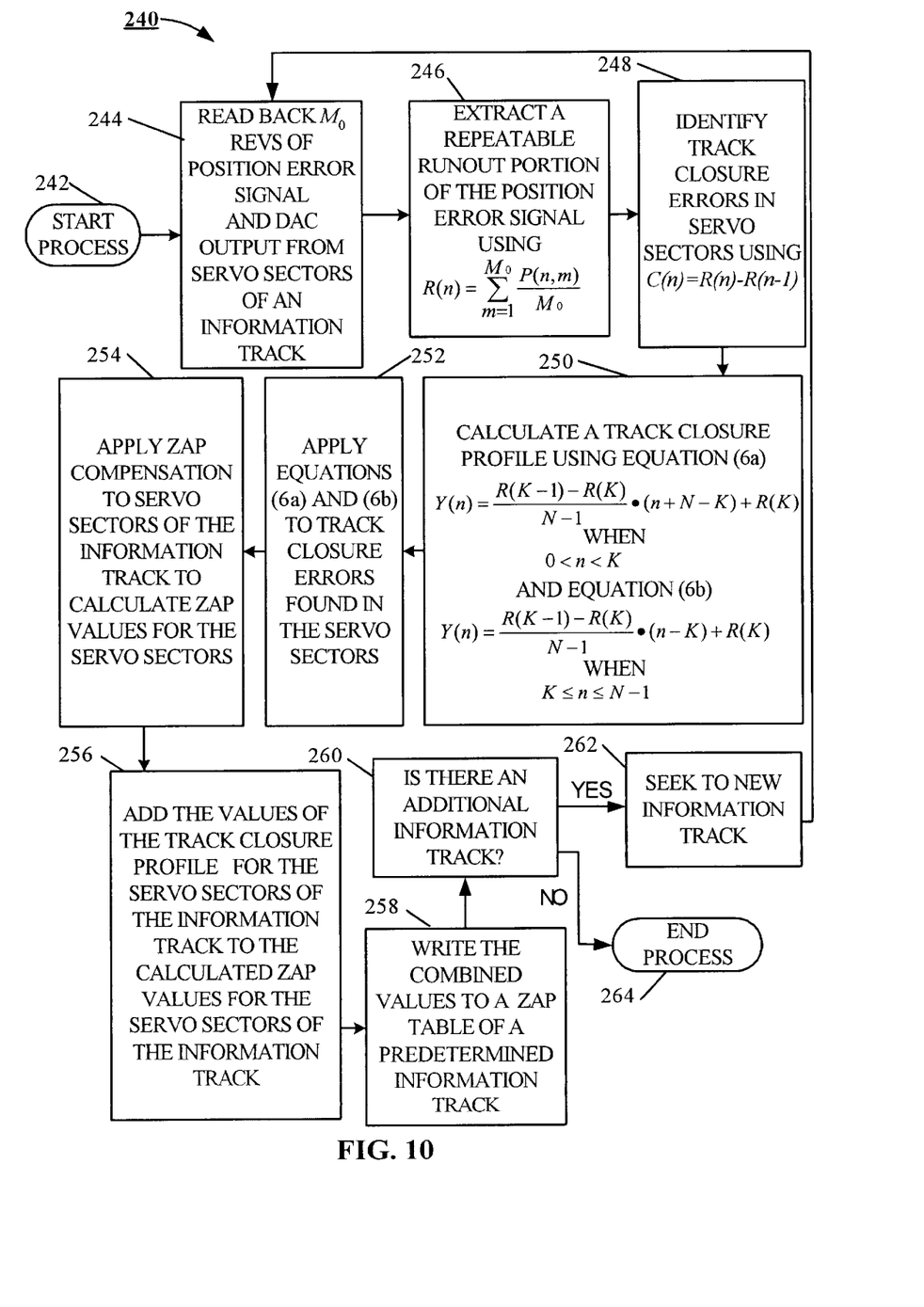
FIG. 10 is a flow chart of a method used in integrating the track closure profile of FIG. 5 into a zero acceleration path compensation technique table for use in resolving the track closure error from the position control signal provided by the servo control circuit of the data storage device of FIG. 1.

FIG. 10 depicts a combined servo compensation signal generation process 240 beginning at process step 242. At process step 244, a plurality of measured actuator position values (such as 194) are read from each servo sector (such as 184) of a selected information track (such as 120) by a read/write head (such as 118) and stored in a random access memory portion (such as 152) of a servo engine (such as 148). The plurality of measured actuator position values for each servo sector is read during each revolution of a plurality of resolutions of the selected information track beneath the read/write head. In process step 246, the plurality measured actuator position values are read from the random access memory for a selected servo sector (such as 188) and utilized by an equation in the form of $$R(n) = \sum_{m=1}^{M_0} \frac{P(n, m)}{M_0}$$

(Equation 1 from above) to extract and determine a repeatable run-out value for the selected servo sector.

The combined servo compensation signal generation process 240 continues at process step 248, where presence of a track closure error (such as 186) is determined through the use of an equation in the form of $C(n)=R(n)-R(n-1)$ (Equation 2 from above). Upon discovery of the track closure error by process step 248, the process continues with process step 250 by calculating the track closure profile (such as 190) by using a pair of equations, (Equations 6a and 6b from above), in the form of $$Y(n) = \frac{R(K-1) - R(K)}{N-1} \cdot (n + N - K) + R(K) \text{ when } 0 < n < K$$

and in the form of $$Y(n) = \frac{R(K-1) - R(K)}{N-1} \cdot (n - K) + R(K) \text{ when } K \le n \le N - 1$$

respectively.

Where n is a selected servo sector located between a servo sector designated as servo sector zero (such as 174) and a servo sector N−1. Through utilization of equations (6a) and (6b), a track closure compensation value is determined for each servo sector of the selected information track. In process step 252, each track closure compensation value is utilized as a feed forward compensation signal to eliminate the track closure error from the selected track. Then, in process step 254, a zero acceleration path compensation technique is applied to the servo sectors of the information track to calculate zero acceleration path values for each of the selected servo sectors.

The combined servo compensation signal generation process 240 continues at process 256 where the track closure compensation value for each particular servo sector determined in process step 252 is combined with the zero acceleration path value calculated in process step 254 for the same particular servo sector and written to a zero acceleration path table located in a predetermined information track of the recording surface during process step 258. In process step 260, a query is made to determine if additional information tracks remain to be analyzed. If additional information tracks remain to be analyzed, the combined servo compensation signal generation process 240 continues to process step 262 where a seek operation is performed to align the read/write head with a next information track and process steps 244 through 262 is repeated for the next information track. If no additional information tracks remain to be analyzed, the combined servo compensation signal generation process 240 continues to end process step 264 and process is concluded.

Accordingly, the present invention is directed to a method for resolving a track closure error from a data storage device. In accordance with one embodiment, steps of measuring a position error signal for each of a plurality of servo sectors of the data storage device (such as step 224), extracting a repeatable run-out value from each position error signal for each servo sector of the plurality of servo sectors (such as step 226), determining a value of a change in value between the repeatable run-out value of a first servo sector of a pair of adjacent servo sectors and the repeatable run-out value of a second servo sector of the pair of adjacent servo sectors (such as step 228) to provide a track closure value, comparing the track closure value with a predetermined value of a track closure threshold value to identify the track closure error (such as step 230), establishing a track closure profile to dissipate the track closure error over the plurality of servo sectors of the data storage device (such as step 232), and injecting the track closure profile into a closed-loop servo system as a feed forward compensation input for compensating the position error signal to resolve the track closure error from the position control signal, the servo control circuit used to inject the track closure profile into the closed-loop servo system (such as step 234) are utilized to substantially remove the track closure error from a position control signal provided by a servo control circuit as a means for resolving the track closure error from the data storage device.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising the steps of:
   (a) determining a repeatable run-out value from a position error signal of each of a plurality servo sectors;
   (b) determining a relationship between the repeatable run-out value of a first servo sector and the repeatable run-out value of a second servo sector;
   (c) identifying a track closure error based on the relationship;
   (d) establishing a track closure profile based on the track closure error.

2. The method of claim 1, in which determining the repeatable run-out value from each of a plurality of servo sectors comprises the steps of:
   (a1) measuring an amplitude of the position error signal for each servo sector of the information track during each of a plurality of revolutions; and
   (a2) determining the repeatable run-out value of the position error signal for the selected servo sector from the measured amplitudes.

3. The method of claim 1, in which the track closure error is identified when a magnitude of a track closure value exceeds a track closure threshold value.

4. The method of claim 1, in which establishing the track closure profile comprises the steps of:

(d1) associating a value of the servo counts of the track closure error with the first servo sector;
   (d2) determining a value of the track closure profile at each servo sector having an address less than an address of the first servo sector; and
   (d3) discerning a value of the track closure profile at each servo sector having an address greater than the address of the first servo sector.

5. The method of claim 4, in which the value of the the track closure profile of a servo sector with an address less than the address of the first servo sector is determined by a first predetermined relationship, and in which the track closure profile value at a servo sector with an address greater than the address of the first servo sector is determined by a second predetermined relationship.

6. The method of claim 5, in which the first predetermined relationship is a first predetermined equation, and in which the second predetermined relationship is a second predetermined equation.

7. A method for operating a storage apparatus comprising the step of injecting a track closure profile input into a servo system to resolve a track closure error.

8. The method of claim 7, in which the track closure profile is applied to a measured actuator position signal.

9. The method of claim 8, in which the track closure profile applied to the measured actuator position signal is applied to a reference signal to provide a position control error signal.

10. The method of claim 9, in which a position control signal is provided responsive to the position error signal, the position control signal at least reduces the track closure error.

11. A disc drive comprising:
    a recording surface with an information track having a plurality of servo sectors with at least one of the plurality of servo sectors having a track closure error; and
    a servo system adapted to utilize a track closure profile to at least reduce the track closure error.

12. The disc drive of claim 11 in which the servo system applies the track closure profile to a measured actuator signal.

13. The disc drive of claim 12, in which the servo system applies the track closure profile to a measured actuator signal.

14. The disc drive of claim 13, in which the servo system applies the track closure profile combined with the zero acceleration path signal to the measured actuator signal.

15. The disc drive of claim 14, in which each servo system provides a signal responsive to the application of the track closure profile and the measured actuator position, the signal is compared to a reference signal to generate a position error signal.

16. The disc drive of claim 15, in which the servo system generates a position control signal responsive to the position error signal.

17. The disc drive of claim 16, further comprises an actuator assembly that receives the position control signal to at least reduce the track closure error.

* * * * *